United States Patent [19]

Schindler

[11] 4,208,904
[45] Jun. 24, 1980

[54] METHOD OF MEASURING LONG SHAFT TORQUE

[75] Inventor: Earle R. Schindler, New Orleans, La.

[73] Assignee: Resco, Inc., New Orleans, La.

[21] Appl. No.: 925,504

[22] Filed: Jul. 17, 1978

[51] Int. Cl.² .............................. G01L 3/10
[52] U.S. Cl. .................................. 73/136 A
[58] Field of Search ...................... 73/136 A

[56] References Cited

U.S. PATENT DOCUMENTS

| 2,947,168 | 8/1960 | Yang | 73/136 A |
| 3,587,305 | 6/1971 | Parkinson | 73/136 A |
| 3,824,848 | 7/1974 | Parkinson | 73/136 A |
| 3,935,733 | 2/1976 | Schindler | 73/136 A |

FOREIGN PATENT DOCUMENTS

| 2238923 | 7/1973 | France | 73/136 A |
| 968503 | 9/1964 | United Kingdom | 73/136 A |

*Primary Examiner*—Charles A. Ruehl
*Attorney, Agent, or Firm*—Clarence A. O'Brien; Harvey B. Jacobson

[57] ABSTRACT

A method of measuring long shaft torque by pre-recording two magnetic tapes, through air gaps, with similar continuous sine wave signals; and by fixing the pre-recorded tapes spaced longitudinally apart as loops around the long shaft at no torque load, and with the continuous sine wave signals of the respective tape loops in approximate phase; and by each tape loop being opposed by a pair of air-spaced, diametrically positioned playback heads, one pair being rotationally adjustable to precisely synchronize the phases of the sine wave signals of both tapes, and both pairs of playback heads cooperating to pick up sine wave signals from both tape loops; and by transmitting the sine wave signals for each side, respectively, to an associated electronic circuit, each circuit for producing an analog voltage proportional to half of the transmitted torque of the long shaft as it rotates under a torque load and plus and minus voltage errors due to rotating long shaft skew; and by finally summing and integrating the half torque voltages to a voltage proportional to the full transmitted voltage with the plus and minus voltage errors cancelling out, the result being readable on a voltmeter calibrated for torque.

6 Claims, 4 Drawing Figures

METHOD OF MEASURING LONG SHAFT TORQUE

BACKGROUND OF THE INVENTION

The invention relates generally to measuring shaft torque, and more particularly to a method of measuring long shaft torque that eliminates errors due to long shaft skew.

It is old in the prior art to measure shaft torque by means of phase shift between sine wave signals from similarly recorded magnetic tapes spaced longitudinally apart on a torque loaded shaft. The magnetic tapes and heads were always subject to frictional wear, and the results always reflected errors due to shaft skew. Attention is invited to U.S. patents to Schindler, U.S. Pat. No. 3,935,733 of which this application is an improvement; to Pratt U.S. Pat. No. 3,871,215; to Holden U.S. Pat. No. 2,586,540; to Bart U.S. Pat. No. 3,604,255; and British patent to DeHaviland U.S. Pat. No. 968,503.

SUMMARY OF THE INVENTION

It is an object of the invention to provide a method of recording and playing back magnetic tapes without frictional wear.

Another object of the invention is to provide a method of simultaneously pre-recording magnetic tapes with a continuous sine wave signal of a desired frequency.

Another object of the invention is to provide a method of measuring long shaft torque by use of said pre-recorded tapes in which unavoidable long shaft skew errors are made self-eliminating.

DESCRIPTION OF THE INVENTION

Figure 1:
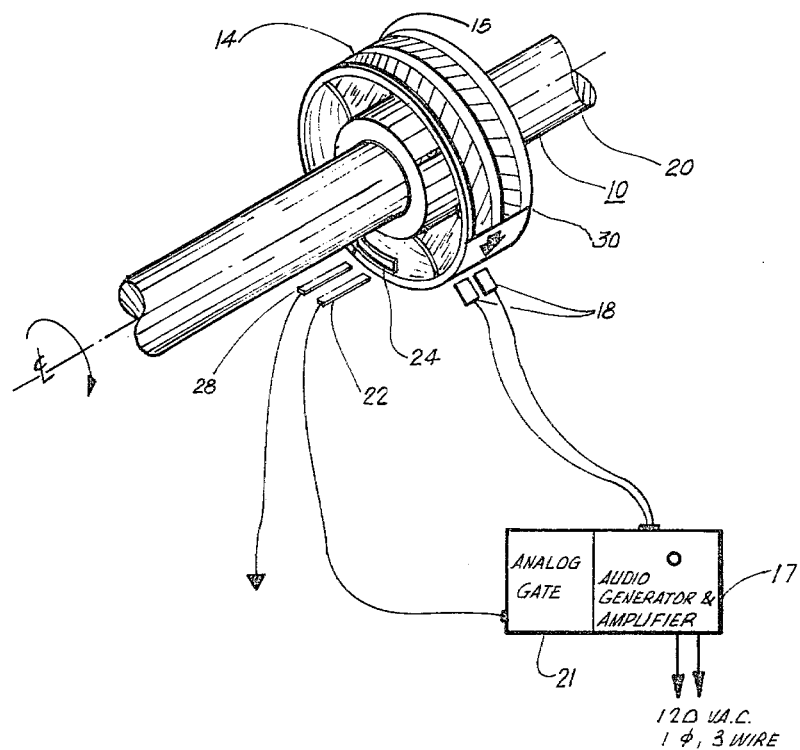
FIG. 1 is a block diagram of tape recording apparatus.

Referring to FIGS. 1–4, the invention comprises a method of measuring long shaft torque by providing a magnetic tape pre-recording system 10 for recording continuous audio sine wave signals on a pair of magnetic tapes 14 and 15 secured around a recording wheel 20 mounted for rotation and having a diameter greater than a long shaft 44. The pre-recording begins and ends at 0 phase angle within one revolution of the recording wheel turning with no torque load. A playback system 16 is provided for the simultaneous playback of both tapes 14 and 15 when they are fixed spaced longitudinally on the long shaft with the respective sine wave signals of both tapes continuous and in phase and the long shaft turning at no torque. When the long shaft is rotated under normal operating speed and torque conditions, a phase shift between tape sine wave signals, measured at diametrically opposed sides of the long shaft by opposed magnetic playback heads 36, 38 and 40, 42 spaced in transverse pairs from each tape and in longitudinal pairs from both tapes, is a measure of the respective halves of the long shaft torque including errors due to long shaft skew that cancel out when the halves are added.

Referring to FIG. 1, an audio generator and amplifier 17 is provided for generating continuous sine wave signals to be received by a pair of magnetic recording heads 18 respectively spaced about 0.05" from tapes 14 and 15, respectively, the tapes being fixed peripherally to the recording wheel 20 side by side. The sine wave signals are gated, for an initial revolution, to the magnetic recording heads by an analog gate 21, controlled by pulses from a photosensor 22 actuated by reflections of a constant light source 28 on a reflecting strip 24 fixed to recording wheel 20. For the first revolution of the recording wheel, beginning at starting mark 30, analog gate 21 allows the sine wave signal to be routed to the recording amplifier 17 and recording heads 18 prior to the tapes 14 and 15 arriving at the recording heads. A recording frequency of 50 to 500 hz. at shaft operating speed and no torque load records a continuous tone frequency on the tapes. The formula for relating shaft speed and recording frequency is as follows: diameter of recording wheel/diameter of long shaft×RPM of recording wheel/maximum RPM of long shaft×1000.

Figure 2:
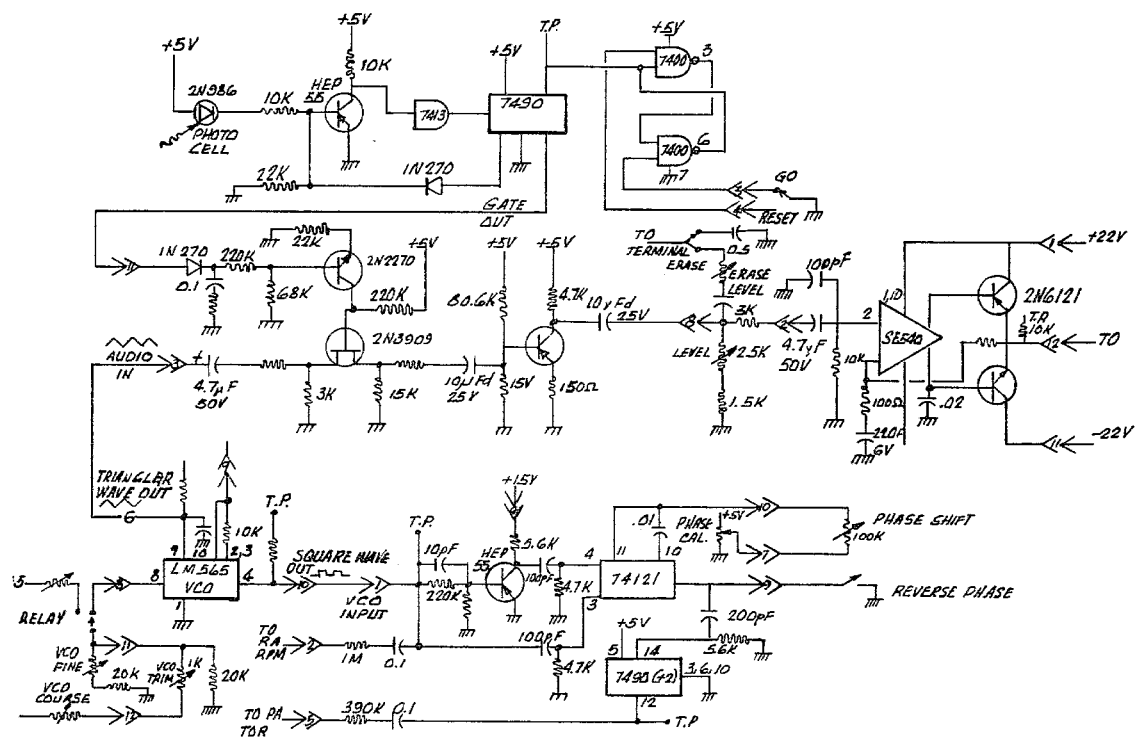
FIG. 2 is a schematic diagram of the apparatus of FIG. 1.

Referring to FIG. 2, the schematic gives the standard electronic parts designations and values of the electronic circuits described for FIG. 1, and also includes a stage for field checking calibration of torque meters, the stage comprising a voltage controlled oscillator (LM565) and a phase shift network connected therewith.

Figure 3:
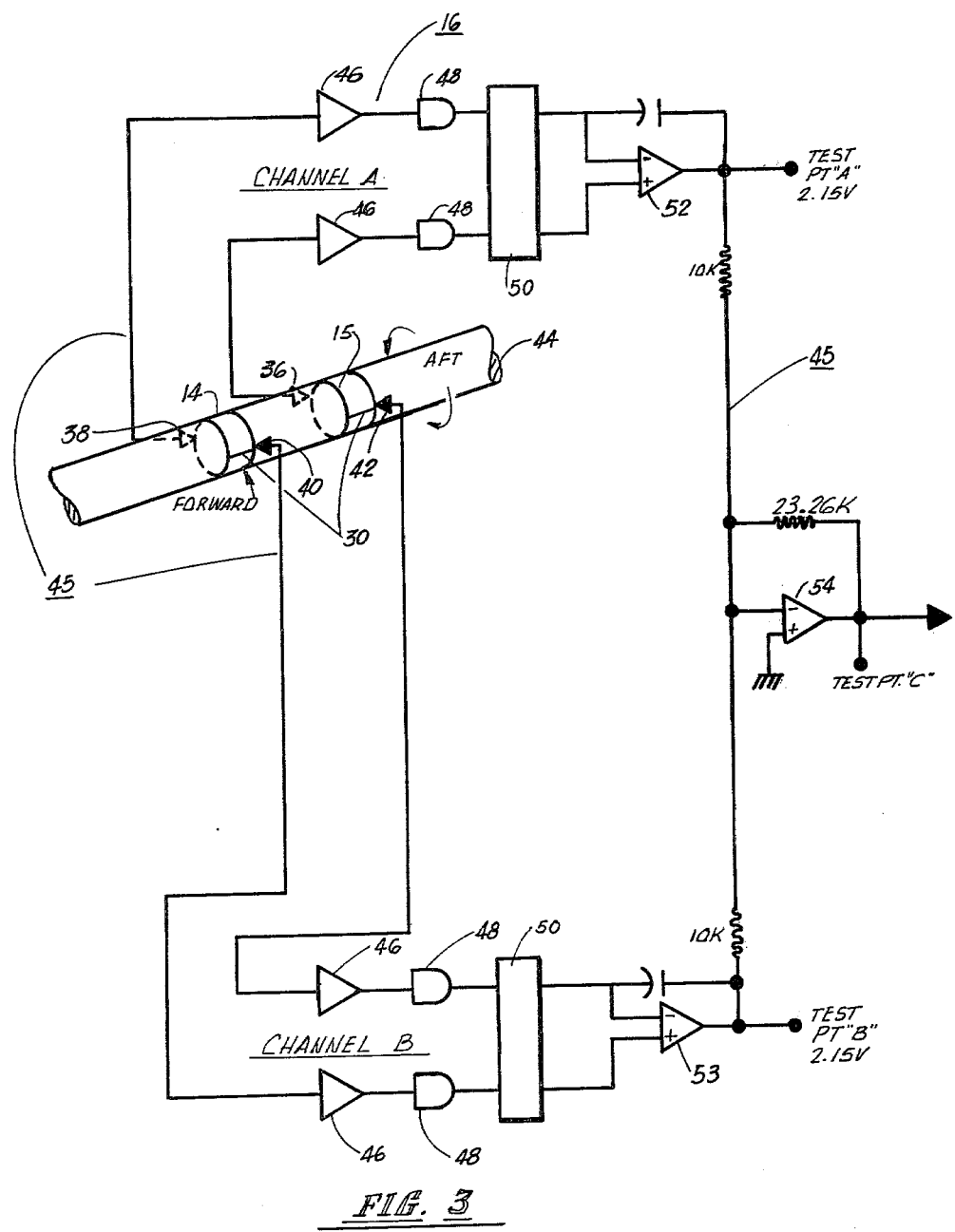
FIG. 3 is a block diagram of torque measuring apparatus.

Referring to FIG. 3, the playback system 16 comprises the playback heads 36, 38 and 40, 42 which are arranged in longitudinally spaced forward and aft pairs along diametric sides of the long shaft, from which they are also transversely and oppositely spaced, as well as from the respective pre-recorded tapes having their respective ends joined to form respective continuous loops and with the respective sine wave signals thereon coinciding at 0 phase angle at the joined ends. An electronic control circuit 45 comprising two equal channels A and B, each comprising a pair of preamplifiers 46 that connect respectively to a forward and an aft head of said diametric pairs of playback heads, and to Schmitt triggers 48, thence to dual flip-flop circuits 50 that produce square waves delayed in time proportional to a phase shift between sine wave signals from from said fore and aft longitudinal pairs of heads and integrated by associated integrators 52 and 53 into signal voltages, each proportional to half the long shaft torque plus and minus, respectively, voltage errors due to shaft skew. The signal voltages from channels A and B are summed and integrated by integrator 54 to produce an analog voltage proportional to the transmitted torque of the long shaft without the skew errors which cancel out. The output of integrator 54 can be read directly from a voltage meter calibrated in torque notation.

Figure 4:
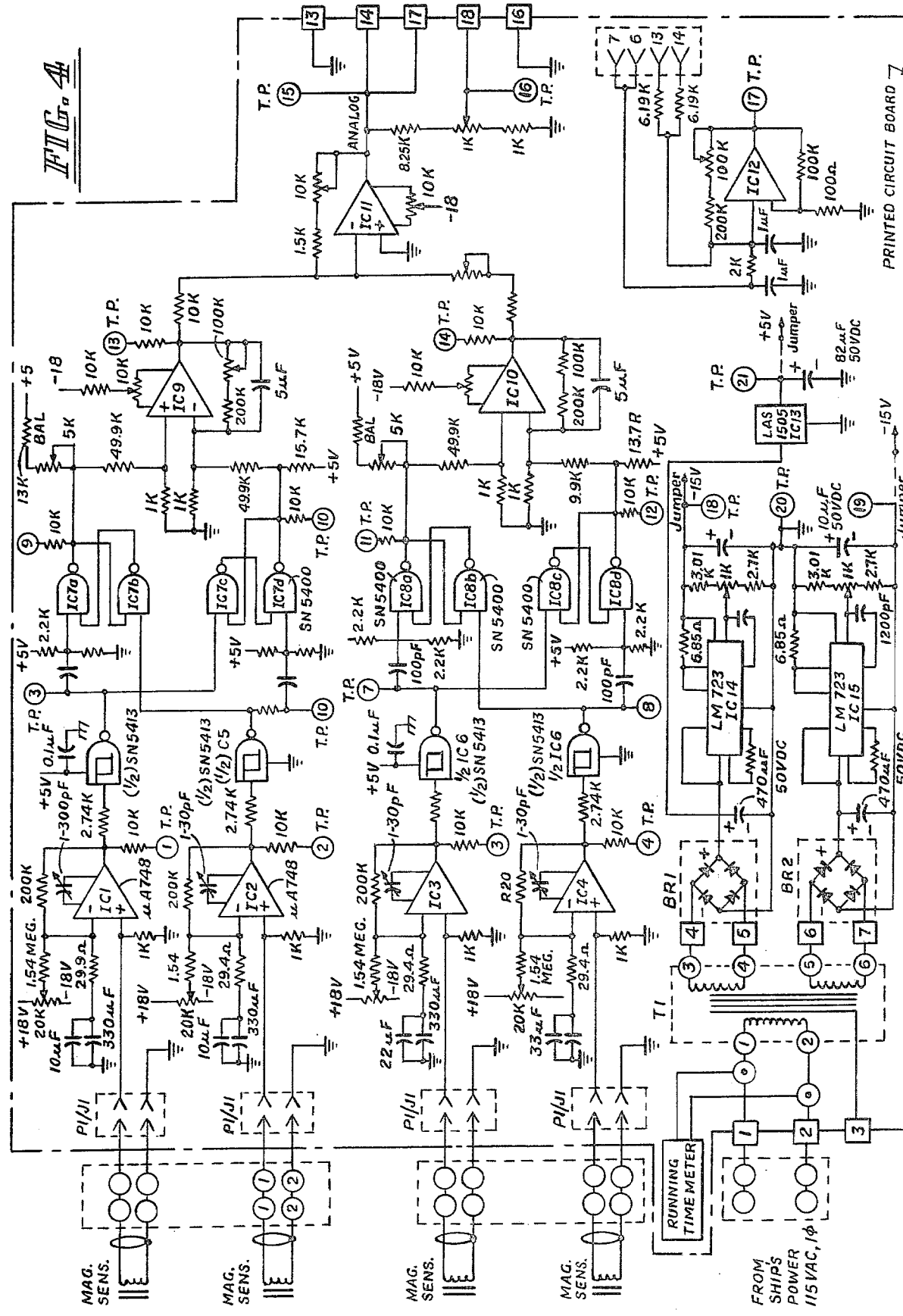
FIG. 4 is a schematic diagram of the apparatus of FIG. 3.

Referring to FIG. 4, the schematic gives the standard electronic parts designations and values of the electronic circuits described in FIG. 3, and also includes a circuit for an electronic power pack to provide power to the control circuit 45 connected to an outside power source.

To calibrate the system for use, the tapes 14 and 15 are pre-recorded and fixed to the long shaft as hereinbefore described. Long shaft 44 is rotated at no torque and the aft heads 36 and 42 circumferentially adjusted to produce 0 voltage at integrators 52 and 53. Each integrator is adjusted to produce 10 millivolts output per one micro second time delay or phase shift. The two voltages for the integrators 52 and 53 are summed at the inverting input of the adder-multiplier- integrator 54 which has a gain of 2.325. The net result is a +10 volt output. For example, voltage levels may be as follows:

```
  −2.15 volts   (integrator 52)
  −2.15 volts   (integrator 53)
  −4.30 volts   (summing integrator 54)
  × −1         (inverting)
  +4.30

+4.30
  ×2.325       (gain of Int 54)
  10.00        (torque output)
```

Thus with no skew both sets of magnetic playback heads read the actual positive torque developed in the shaft. Any movement of the shaft in the diametrical plane of the playback heads or vertical thereto, no phase shifting occurs and no errors are developed. The movement only changes amplitude of signal strengths and otherwise do not affect the torque readings.

With long shaft skew present, errors are corrected as follows: a vertical upward skew at the front end of shaft 44 produces a pulse width equal to the positive torque plus negative skew at the output of flip-flop 50 in channel A (see FIG. 3). Simultaneously a pulse width equal the positive torque plus positive skew is produced in channel B. When the two signals from integrators 52 and 53 are summed at integrator 54, the net result is that the two errors caused by skew being equal in magnitude but opposite in polarity cancel. For down vertical skew at the forward end of shaft 44, the same reasoning holds true but with polarities reversed respectively for the same result. Thus an upward skew of 11 minutes of arc produces 0.048″ of motion at the forward end of the shaft (for a longitudinal distance between playback heads of 30″) that results in a phase shift which creates a false torque pulse of 720 microseconds, producing in channel A an output of +7.20 volts, and in channel B an output of −720 volts. Similarly with downward skew of the same amount, the resultant torque pulse width output of Channel A is +5.05 volts, and of channel B −9.35 volts, with the resultant output of integrator 54 of 10 volts derived as follows: +5.05−9.35=−4.30×2.325 (gain)=10.00 (inverted).

The voltage output of the playback system 16 is connected to a voltmeter calibrated to read in any convenient scale of torque.

What is claimed is:

1. A method of measuring long shaft torque comprising the steps of:
   (a) pre-recording a pair of magnetic tapes with similar sine wave signals in the audio frequency range and without shaft skew errors, said tapes having lengths for looping around said long shaft with respective ends meeting and the sine wave signal of each loop being continuous and said pre-recording comprising the steps of: mounting said magnetic tapes on a recording wheel having a larger circumference than said long shaft; rotating said recording wheel on a short shaft mounted to turn without skew; and gating an audio generator and amplifier to simultaneously record a sine wave signal on both said tapes for one turn only of said recording wheel;
   (b) fixing said pre-recorded magnetic tapes in loops and mounting said tapes spaced longitudinally around said long shaft with the sine wave signals of the loops in phase;
   (c) rotating said long shaft under a torque load;
   (d) picking up phase shifts in the sine wave signals at two diametrically opposed sides of the longitudinally spaced, pre-recorded tape loops with two pairs of magnetic playback heads;
   (e) electronically generating analog voltages from said phase shifted sine wave signals and long shaft skew at each side of said rotating long shaft and tape loops that are respectively proportional to half said torque load plus and minus long shaft skew errors; and
   (f) electronically adding said half torque analog voltages to obtain their sum less the plus and minus skew errors which cancel in the summing to give an analog voltage proportional to the full torque load for reading directly from a voltmeter calibrated in torque.

2. The method of measuring long shaft torque as described in claim 1 characterized in that fixing the tapes to said long shaft with sine wave signals in phase is approximate, requiring mounting a pair of said playback heads for rotational adjustment.

3. A method of pre-recording a pair of magnetic tapes with similar sine wave signals in the audio frequency range, said tapes having signals for looping around a long shaft with respective ends meeting and the sine wave signal of each loop being continuous, comprising the steps of:
   (a) mounting said magnetic tapes on a recording wheel having a larger circumference than said long shaft;
   (b) rotating said recording wheel on a short shaft mounted to turn without skew;
   (c) producing an audio signal and recording said signal simultaneously on both tapes for one turn only of said recording wheel; and
   (d) mounting said pre-recorded magnetic tapes in loops spaced longitudinally of said long shaft with signals recorded on said tapes in phase.

4. The method of claim 3 wherein the step of producing an audio signal and recording said signal on both tapes includes the steps of:
   fixing an initiation mark on said recording wheel; and
   gating an audio generator and amplifier to a pair of recording heads upon sensing of said initiation mark.

5. A method of measuring long shaft torque comprising the steps of:
   (a) affixing sine wave signals at longitudinally spaced locations about the periphery of said long shaft with the sine wave signals in phase;
   (b) rotating said long shaft under a torque load;
   (c) picking up phase shift signals in the sine wave signals at two diametrically opposed sides of the longitudinally spaced signals with two pairs of magnetic playback heads;
   (d) independently integrating each of said phase shifts;
   (e) electronically adding said integrated phase shifts.

6. The method of claim 5 wherein the step of picking up phase shifts with two pairs of magnetic playback heads includes the steps of amplifying the signals received by said magnetic playback heads; using said amplified signals to operate mono-stable circuits; and using the outputs of said mono-stable circuits to operate bi-stable circuits for sensing said phase shifts.

* * * * *